April 4, 1944.  P. C. DAY  2,345,733
GEARED POWER TRANSMISSION
Filed Dec. 12, 1938  2 Sheets-Sheet 1

INVENTOR.
PERCY C. DAY
BY
ATTORNEY

April 4, 1944. P. C. DAY 2,345,733
GEARED POWER TRANSMISSION
Filed Dec. 12, 1938 2 Sheets-Sheet 2
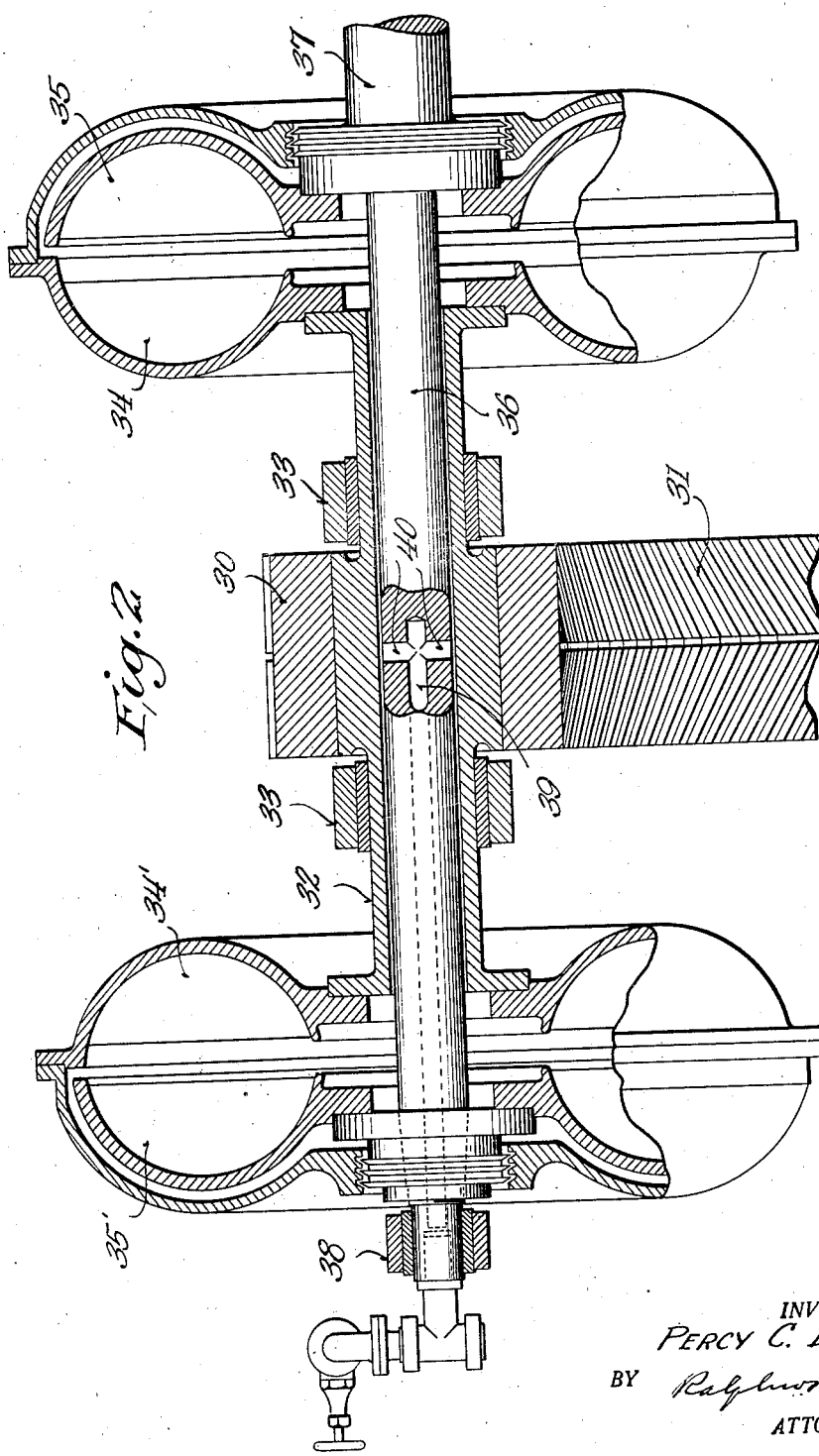
INVENTOR.
PERCY C. DAY
BY
ATTORNEY Patented Apr. 4, 1944

2,345,733

UNITED STATES PATENT OFFICE 2,345,733

GEARED POWER TRANSMISSION

Percy C. Day, Brookfield, Wis., assignor to The Falk Corporation, Milwaukee, Wis., a corporation of Wisconsin Application December 12, 1938, Serial No. 245,157

4 Claims. (Cl. 74—410)

This invention relates to geared power transmissions of the type involving dynamic couplings.

It has been found that in transmissions of this type, as heretofore designed, the gears wear unevenly, indicating an imperfect meshing relation. This I attribute largely to the weight of the coupling or rather of that part thereof which is ordinarily carried by an end of the pinion shaft and to a consequent disturbance of the shaft in its bearings causing an imperfect positional relation between the pinion and its mating gear. This objectionable condition becomes most serious when the face width of the pinion is relatively large, as in heavy duty transmissions.

An object of the present invention is to eliminate this objectionable condition in transmissions of the type mentioned.

Other more specific objects and advantages will appear, expressed or implied, in the following description of two illustrative embodiments of this invention.

For purposes of illustration and explanation the invention will be shown and described as embodied in transmissions involving hydraulic couplings, although the use of electric couplings or other forms of dynamic couplings, wherein the torque is transmitted by other than physical engagement between the driving and driven coupling parts, are contemplated.

In the accompanying drawings:

Fig. 2 is a similar view of another embodiment of the invention.

Figure 1:
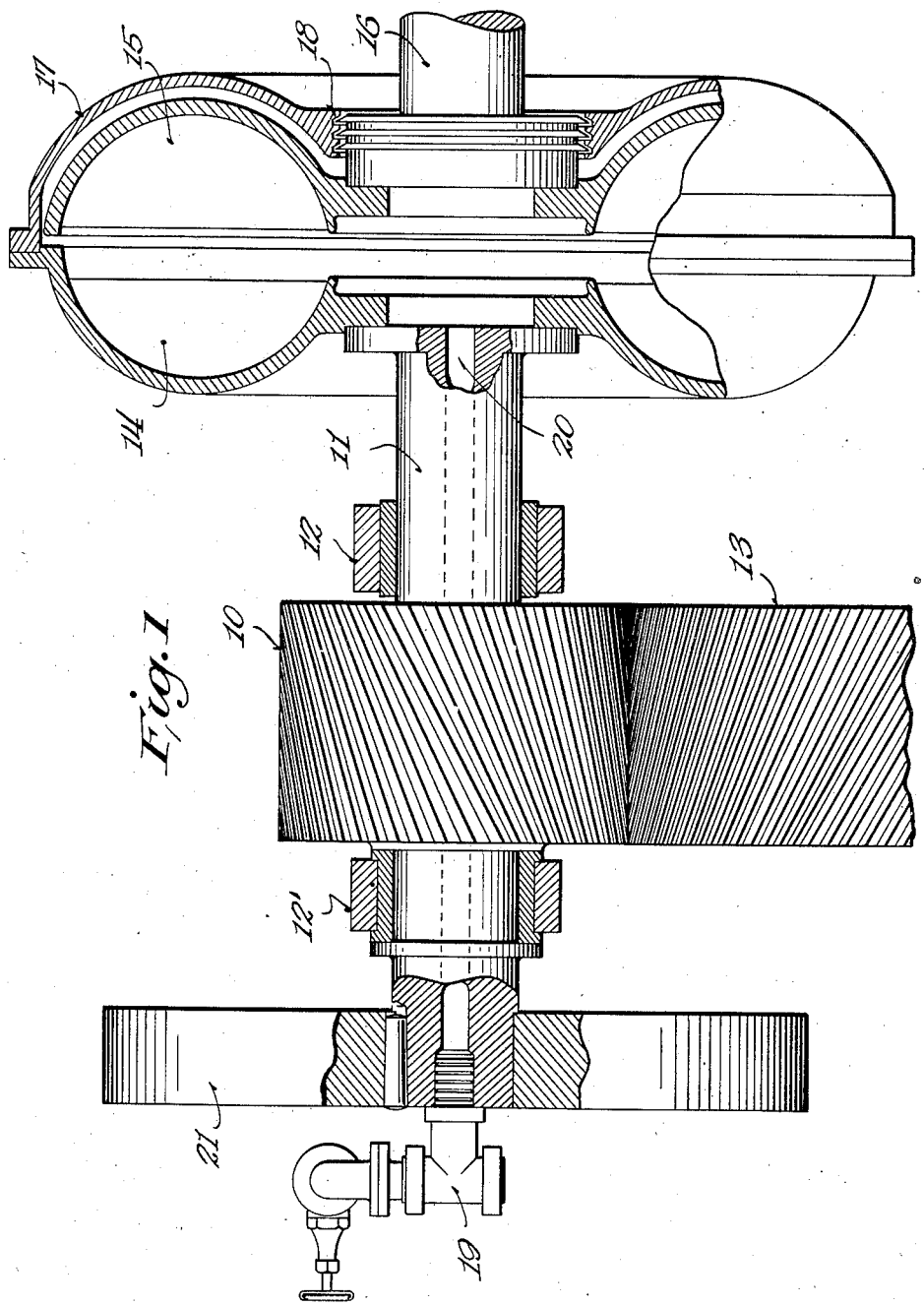
Figure 1 is a fragmentary view diagrammatically illustrating a geared power transmission embodying the present invention.

The transmission shown in Fig. 1 comprises a conventional helical pinion 10 carried by a shaft 11 journalled in the usual manner in spaced bearings 12 and 12' disposed adjacent opposite ends of the pinion. The pinion 10 is shown meshing with a driven gear 13.

A conventional hydraulic coupling is shown at one end of the pinion shaft 11. It includes the usual bladed rotor 14 fixed to and carried by the end of the pinion shaft and a coacting bladed rotor 15 fixed to and carried by a drive shaft 16. The rotor 15 is enclosed, as usual, within a housing portion 17 carried by the rotor 14, a conventional oil seal 18 being provided between the housing portion 17 and shaft 16.

Oil or other appropriate liquid is supplied to the coupling through an appropriate fitting 19 which communicates with the coupling through a longitudinal channel 20 in the pinion shaft.

With the parts thus arranged, the weight of the rotor 14 imposes a load on the end of the pinion shaft 11 tending to tilt the latter in its bearings and to disturb the position of the pinion 10 relative to its mating gear. To overcome this tendency a weight 21 is mounted upon the opposite end of the pinion shaft, so as to position between said bearings the center of gravity of the combined weight of said shaft, pinion, rotor and weight. The weight 20 may assume various forms, but in this instance it comprises a disk keyed or otherwise fixed to the shaft.

It will also be noted that in the arrangement shown in Fig. 1, the bearing 12' coacts with the pinion shaft 11 to retain the latter against axial displacement, and that the helix angle of the pinion teeth is preferably such that the axial thrust, resulting from the reaction thereof against the gear 13 is in a direction opposing or counteracting the axial thrust of the rotor 14, induced by the reaction of the energizing liquid thereagainst, so that the axial thrust imposed on the bearing 12 is reduced to a minimum.

The transmission shown in Fig. 2 comprises a double-helical pinion 30 meshing with a gear 31 and carried by a hollow shaft 32 journalled in spaced bearings 33 adjacent opposite ends of the pinion.

In this instance two hydraulic couplings are employed, arranged at opposite ends of the shaft 32. These couplings include conventional bladed rotors 34 and 34', fixed to and carried by opposite ends of the shaft 32 so that each balances the weight of the other. These couplings also include bladed rotors 35 and 35', both fixed to and carried by a shaft 36 which extends through the hollow pinion shaft 32. With the parts thus arranged, it will be noted that the rotors 34 and 34' are mechanically connected to each other, as are the rotors 35 and 35', so that the hydraulically induced axial thrust in each coupling is sustained and balanced by the corresponding thrust of the other.

The shaft 36 constitutes an extension of the drive shaft 37 and is preferably supported at its forward end by an appropriate steady bearing 38. Shaft 36 contains a channel 39 and ports 40 through which the oil or other appropriate liquid may be supplied to the couplings through the surrounding hollow shaft 32.

Various changes may be made in either of the embodiments of the invention hereinabove specifically described without departing from or sacrificing the advantages of the invention as defined in the appended claims.

I claim:

1. In a power transmission the combination of a shaft, spaced bearings supporting said shaft, a pinion carried by said shaft between said bearings, a dynamic coupling, said coupling having a rotor carried by one end of said shaft, and means carried by the opposite end of said shaft tending to counterbalance the weight of said rotor, the center of gravity of the combined weight of said shaft, pinion, rotor and means being disposed between said bearings to thereby prevent disturbance of the pinion position by the weight of said rotor.

2. In a power transmission the combination of a shaft, spaced bearings therefor, a pinion carried by said shaft between said bearings, and two dynamic couplings arranged at opposite ends of said shaft, each of said couplings comprising a rotor carried by an adjacent shaft end and cooperating with each other to position between said bearings the center of gravity of the combined weight of said shaft, pinion and rotors.

3. In a power transmission the combination of a hollow shaft, spaced bearings therefor, a pinion carried by said shaft between said bearings, two dynamic couplings arranged at opposite ends of said shaft, each of said couplings comprising a rotor fixed to the adjacent end of said shaft and a coacting rotor, said first named rotors cooperating to position the center of gravity of the combined weight of said shaft, pinion and first named rotors between said bearings, and means for driving said couplings including a shaft extending through said hollow shaft and connecting said coacting rotors.

4. In a power transmission the combination of a hollow shaft, a double helical pinion mounted on said shaft, said shaft and pinion being free to float endwise to permit accommodation of said pinion to a mating gear, a second shaft extending freely through said first named shaft, a pair of simultaneously operable dynamic couplings mounted one on each side of said pinion, each of said couplings having a rotary impeller mounted on one of said shafts and a coacting runner mounted upon the other of said shafts, whereby the thrust of one of said couplings counteracts that of the other.

PERCY C. DAY.